United States Patent
Liu et al.

(10) Patent No.: US 9,375,120 B2
(45) Date of Patent: Jun. 28, 2016

(54) DUST COLLECTOR FOR CLEANER

(71) Applicants: JIANGSU MIDEA CLEANING APPLIANCES CO., LTD., Jiangsu (CN); MIDEA GROUP CO., LTD., Foshan (CN)

(72) Inventors: Shenghui Liu, Jiangsu (CN); Quan Xu, Jiangsu (CN)

(73) Assignees: Jiangsu Midea Cleaning Appliances Co., Ltd., Jiangsu (CN); Midea Group Co., Ltd., Foshan (CN)

( * ) Notice: Subject to any disclaimer, the term of this patent is extended or adjusted under 35 U.S.C. 154(b) by 0 days.

(21) Appl. No.: 14/852,953

(22) Filed: Sep. 14, 2015

(65) Prior Publication Data

US 2016/0000285 A1     Jan. 7, 2016

Related U.S. Application Data

(63) Continuation of application No. PCT/CN2014/075272, filed on Apr. 14, 2014.

(51) Int. Cl.
*B01D 50/00* (2006.01)
*A47L 9/16* (2006.01)
*B01D 45/16* (2006.01)
*B01D 45/12* (2006.01)
*B01D 46/24* (2006.01)

(52) U.S. Cl.
CPC ............... *A47L 9/1683* (2013.01); *A47L 9/165* (2013.01); *A47L 9/1608* (2013.01); *A47L 9/1666* (2013.01); *A47L 9/1691* (2013.01); *B01D 45/12* (2013.01); *B01D 45/16* (2013.01); *B01D 46/2411* (2013.01); *B01D 50/002* (2013.01)

(58) Field of Classification Search
CPC ...... B01D 45/16; B01D 50/002; B01D 45/12; B01D 46/2411; A47L 9/1608; A47L 9/1683
USPC ........... 55/337, 424, 426, 428, 429, 449, 447, 55/DIG. 3
See application file for complete search history.

(56) References Cited

U.S. PATENT DOCUMENTS

| 2,633,596 | A | 4/1953 | Turner et al. |
| 5,093,956 | A | 3/1992 | Saunders et al. |

(Continued)

FOREIGN PATENT DOCUMENTS

| CN | 1947641 A | 4/2007 |
| CN | 1954764 A | 4/2007 |

(Continued)

OTHER PUBLICATIONS

U.S. Appl. No. 14/853,129 Non Final Office Action dated Dec. 2, 2015, 10 pages.

(Continued)

*Primary Examiner* — Dung H Bui
(74) *Attorney, Agent, or Firm* — Lathrop & Gage LLP (57) ABSTRACT

A dust collector for a cleaner is provided, including: a dust container, a cyclone separator and a dust container top cover. The dust container defines an air inlet in a bottom wall thereof. The cyclone separator is disposed in the dust container and defines a cyclone separator inlet communicated with the air inlet and a cyclone separator outlet. The dust container top cover covers the dust container and defines an air outlet communicated with the cyclone separator outlet.

7 Claims, 6 Drawing Sheets

(56) References Cited

U.S. PATENT DOCUMENTS

| | | | |
|---|---|---|---|
| 7,114,216 B2 | 10/2006 | Stephens et al. | |
| 7,422,615 B2 * | 9/2008 | Kim | A47L 9/1608 55/426 |
| 7,708,791 B2 * | 5/2010 | Oh | A47L 9/1625 15/353 |
| 7,749,294 B2 * | 7/2010 | Oh | A47L 5/28 15/319 |
| 7,770,256 B1 | 8/2010 | Fester | |
| 7,776,116 B2 * | 8/2010 | Oh | A47L 9/0081 55/345 |
| 7,780,752 B2 * | 8/2010 | Cha | A47L 9/122 55/288 |
| 7,785,381 B2 * | 8/2010 | Oh | A47L 9/108 15/347 |
| 7,803,205 B2 * | 9/2010 | Oh | A47L 9/122 55/337 |
| 7,883,560 B2 * | 2/2011 | Ni | A47L 9/1625 15/352 |
| 8,252,096 B2 * | 8/2012 | Horne | A47L 9/10 55/DIG. 3 |
| 2002/0129461 A1 | 9/2002 | Wegelin et al. | |
| 2004/0154126 A1 | 8/2004 | Hansen et al. | |
| 2004/0231305 A1 | 11/2004 | Oh | |
| 2005/0066469 A1 | 3/2005 | Oh et al. | |
| 2005/0166560 A1 | 8/2005 | Takemoto et al. | |
| 2006/0213161 A1 | 9/2006 | Archambault et al. | |
| 2006/0254226 A1 * | 11/2006 | Jeon | A47L 9/1625 55/345 |
| 2007/0144116 A1 * | 6/2007 | Hong | A47L 9/0081 55/345 |
| 2008/0190080 A1 * | 8/2008 | Oh | A47L 9/1625 55/343 |
| 2008/0264007 A1 | 10/2008 | Oh et al. | |
| 2008/0295466 A1 | 12/2008 | Cha et al. | |
| 2010/0132316 A1 | 6/2010 | Ni | |
| 2010/0154367 A1 * | 6/2010 | Luo | A47L 5/362 55/337 |
| 2010/0229328 A1 | 9/2010 | Conrad | |
| 2011/0219574 A1 | 9/2011 | Conrad | |
| 2011/0219581 A1 | 9/2011 | Vines et al. | |
| 2011/0314629 A1 | 12/2011 | Conrad | |
| 2012/0284955 A1 * | 11/2012 | Han | A47L 5/362 15/353 |
| 2013/0091660 A1 | 4/2013 | Smith | |
| 2015/0289737 A1 | 10/2015 | Riru et al. | |

FOREIGN PATENT DOCUMENTS

| | | |
|---|---|---|
| CN | 101108105 A | 1/2008 |
| CN | 101108106 A | 1/2008 |
| CN | 101411603 A | 4/2009 |
| CN | 101437596 A | 5/2009 |
| CN | 201333002 Y | 10/2009 |
| CN | 101658405 A | 3/2010 |
| CN | 101721174 A | 6/2010 |
| CN | 101756675 A | 6/2010 |
| CN | 102334954 | 2/2012 |
| CN | 202821202 U | 3/2013 |
| CN | 203341657 U | 12/2013 |
| CN | 203841620 U | 9/2014 |
| JP | 2003180584 A | 7/2003 |
| JP | 2010119623 A | 3/2010 |
| WO | 2011112289 A2 | 9/2011 |

OTHER PUBLICATIONS

U.S. Appl. No. 14/852,920 Non Final Office Action dated Dec. 1, 2015, 14 pages.
U.S. Appl. No. 14/851,926 Non Final Office Action dated Nov. 16, 2015, 11 pages.
PCT/CN2014/075112 English translation of the International Search Report & Written Opinion mailed Jul. 16, 2014, 13 pages.
PCT/CN2014/075272 English translation of the International Search Report mailed Jan. 28, 2015, 2 pages.
PCT/CN2014/075274 English translation of the International Search Report mailed Feb. 4, 2015, 2 pages.

* cited by examiner

DUST COLLECTOR FOR CLEANER

CROSS-REFERENCE TO RELATED APPLICATION

The present application is a continuation of International Application PCT/CN2014/075272, filed Apr. 14, 2014, the entire disclosure of which is incorporated herein by reference.

FIELD

The present disclosure relates to the field of household appliance, more particularly to a dust collector for a cleaner.

BACKGROUND

A dust collector for a cleaner in the related art includes a cyclone barrel, a central filter disposed in the cyclone barrel for filtering dirt like dust, and an air guide tube tangentially connected to an outer side wall of the cyclone barrel and connecting a side wall of the dust container to a side wall of the cyclone barrel. A long air guide tube is needed to communicate an exterior of the dust collector with an air inlet of the dust collector, and the dust containing air enters into a dust container in a tangential direction thereof for the air dust separation.

Because there is a corner at a connection between the air guide tube and the dust container, the air tightness between the cyclone separator and the dust container is poor. Moreover, the air guide tube is long. Therefore, the suction is decreased when a cleaner is working, thus affecting the dust collection efficiency of the cleaner, and the manufacturing cost of components of the dust collector is also high.

SUMMARY

Embodiments of the present disclosure seek to solve at least one of the problems existing in the related art to at least some extent. Accordingly, an object of the present disclosure is to provide a dust collector for a cleaner, in which air enters the dust collector from a bottom thereof.

A dust collector for a cleaner according to embodiments of the present disclosure includes a dust container defining an air inlet in a bottom wall thereof; a cyclone separator disposed in the dust container and defining a cyclone separator inlet communicated with the air inlet and a cyclone separator outlet; a dust container top cover covering the dust container and defining an air outlet communicated with the cyclone separator outlet.

With the dust collector for the cleaner according to embodiments of the present disclosure, air enters the dust collector from a bottom thereof, which significantly shortens the distance from the cyclone separator inlet to the air inlet, and shortens the length of the air guide tube communicated with the air inlet in the cleaner, reduces the power loss, saves enough space for the whole cleaner and the manufacturing cost. Furthermore, because the air inlet is located in a bottom wall of the dust container, the dust collection capacity of the dust container is largely increased. In addition, the suction of the whole cleaner with the dust collector is no more decreased quickly due to a blockage of a filter cotton, which improves the separation efficiency and prolongs the cleaning period of the filter cotton.

Furthermore, the dust collector for the cleaner according to embodiments of the present disclosure may also have the additional technical features as follows.

In some embodiments, the dust collector further includes an air intake tube defining two ends communicated with the air inlet and the cyclone separator inlet respectively. Thus, it is convenient to connect the cyclone separator with the dust container so as to improve the mounting efficiency of the cyclone separator. Moreover, the air inlet is communicated with the cyclone separator inlet via the air intake tube, which facilitates the flowing of the dust containing air flow and the connection between the cyclone separator and the dust container so as to improve the mounting efficiency of the cyclone separator.

In some embodiments, the air intake tube is engaged with the dust container. Thus, a lower end of the air intake tube is engaged stably with a bottom wall of the dust container, and it is possible to improve the air tightness of the connection between the air intake tube and the bottom wall of the dust container.

In some embodiments, the cyclone separator comprises: a cyclone barrel defining an upper open end, the cyclone separator inlet being formed in a bottom wall of the cyclone barrel; a cyclone separator end cover disposed above the cyclone barrel, the cyclone separator outlet being formed in the cyclone separator end cover; a filter defining an upper end communicated with the cyclone separator outlet, and a lower end extended into the cyclone barrel; an air guide barrel defining a lower end communicated with the cyclone separator inlet and an upper closed end, and defining an air vent in a side wall of the air guide barrel communicated with the cyclone barrel. Thus, air enters into the dust collector from a bottom thereof and the dust containing air into the cyclone separator enters into the cyclone barrel in a direction away from the filter. The dust containing air into the cyclone barrel quickly forms a spiral air flow, and the dust is thrown away from the filter under a centrifugal force, which makes the dust away from the filter to avoid the blockage of the filter caused by the fact that the dust adheres to the filter. The cyclone separator may reduce the blockage of the filter so as to prolong the life of the filter and reduce the cleaning frequency of the filter.

In some embodiments, an upper end of the dust container is open, and the cyclone separator end cover covers the upper end of the dust container. Thus, it is convenient to seal the dust container, which prevents the dust from rising up from the dust container, improves the air tightness of the dust container, and makes the dust collector simple in structure and easy to assemble.

In some embodiments, an air guide plate and an air shield plate are disposed in the cyclone barrel, the air shield plate is disposed above the air vent and no higher than an upper edge of the air guide plate, and at least a part of the air guide plate is extended upwardly and spirally. Thus, the air guide structure with the air flow rising up spirally is used to move the position of the thrown dust upwardly to a largest extent. A high-efficiency cyclone separator is used to raise the dust containing air flow faster on the air guide plate and then throw the dust containing air flow out of the cyclone barrel, such that the dust-air separation is fast and thorough and strips like hairs are also easy to throw so as to reduce the amount of the dust and hairs discharged out of the cyclone separator through the filter. The suction of the whole cleaner with the cyclone separator is no more decreased quickly due to a blockage of the filter cotton, which significantly improves the separation efficiency and prolongs the cleaning period of the filter cotton.

In some embodiments, the air guide plate is annular and comprises: first and second plate bodies perpendicular to an axis of the cyclone barrel respectively; a spiral plate extended spirally in an up-down direction, and defining two ends connected to the first and second plate bodies respectively; a connection plate parallel to an axis of the cyclone separator, and defining two ends connected to the first and second plate bodies respectively. Thus, the air guide plate is simple in structure and convenient to form, and it is convenient for the connection plate to guide the dust containing air upwardly and spirally so as to perform the dust-air separation.

In some embodiments, the first plate body is disposed at a lower edge of the air vent, the air shield plate is disposed at an upper edge of the air vent, the second plate body is flush with the air shield plate, and the connection plate is disposed at a side edge of the air vent. Thus, the dust containing air flow may rise up easily and spirally to avoid poor filtering effect and thus the blockage of the filter caused by the fact that the air flow rises up directly, thus improving the separation efficiency and effect of the cyclone separator to separate the dust containing air flow. Moreover, the dust is thrown to reduce the amount of the dust through the filter.

In some embodiments, the air guide plate is configured as the bottom wall of the cyclone barrel, and the cyclone separator inlet is formed in the air guide plate. Thus, the air guide plate is used directly as the bottom wall of the cyclone barrel, such that the cyclone barrel is simple in structure and easy to form and the formation efficiency of the cyclone barrel is improved.

In some embodiments, the cyclone separator further comprises a barrel body and a separation plate disposed in the barrel body and dividing an inner space of the barrel body in the up-down direction, an upper portion of the barrel boy is configured as the filter, and a lower portion of the barrel body is configured as the air guide barrel. Thus, the air guide barrel is integrally formed on the filter, which may simplify the structure of the cyclone separator so as to facilitate the manufacture and assembly of the cyclone separator.

BRIEF DESCRIPTION OF THE DRAWINGS

These and other aspects and advantages of embodiments of the present disclosure will become apparent and more readily appreciated from the following descriptions made with reference to the accompanying drawings, in which.

REFERENCE NUMERALS dust collector 100;
cyclone separator 1; cyclone barrel 11; cyclone separator end cover 12; filter 13; air guide barrel 14; air guide plate 15; air shield plate 16; air intake tube 17; barrel body 18; separation plate 19; cyclone separator inlet 101; cyclone separator outlet 102; air vent 103; cylindrical side plate 111; snapping groove 141; sliding groove 142; first plate body 151; second plate body 152; spiral plate 153; connection plate 154; snapping projection 171; annular snapping groove 172; height H1 of air guide plate 15; depth H2 of air guide barrel 14; distance H3 between cyclone separator end cover 12 and upper edge of cyclone barrel 11; radius R1 of filter 13; radius R2 of cyclone barrel 11; distance R3 between cyclone barrel 11 and filter 13 in a radial direction of cyclone barrel 11;
dust container 2; air inlet 201;
dust container top cover 3; air outlet 301.

DETAILED DESCRIPTION

Reference will be made in detail to embodiments of the present disclosure. The same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

In the specification, unless specified or limited otherwise, relative terms such as "central", "longitudinal", "lateral", "front", "rear", "right", "left", "inner", "outer", "lower", "upper", "horizontal", "vertical", "above", "below", "up", "top", "bottom", "inner", "outer", "clockwise", "anticlockwise" as well as derivative thereof (e.g., "horizontally", "downwardly", "upwardly", etc.) should be construed to refer to the orientation as then described or as shown in the drawings under discussion. These relative terms are for convenience of description and do not require that the present disclosure be constructed or operated in a particular orientation.

In addition, terms such as "first" and "second" are used herein for purposes of description and are not intended to indicate or imply relative importance or significance. Thus, features limited by "first" and "second" are intended to indicate or imply including one or more than one these features. In the description of the present disclosure, "a plurality of" relates to two or more than two.

In the description of the present disclosure, unless specified or limited otherwise, it should be noted that, terms "mounted," "connected" "coupled" and "fastened" may be understood broadly, such as permanent connection or detachable connection, electronic connection or mechanical connection, direct connection or indirect connection via intermediary, inner communication or inter reaction between two elements. These having ordinary skills in the art should understand the specific meanings in the present disclosure according to specific situations.

In the description of the present disclosure, a structure in which a first feature is "on" a second feature may include an embodiment in which the first feature directly contacts the second feature, and may also include an embodiment in which an additional feature is formed between the first feature and the second feature so that the first feature does not directly contact the second feature, unless otherwise specified. Furthermore, a first feature "on," "above," or "on top of" a second feature may include an embodiment in which the first feature is right "on," "above," or "on top of" the second feature, and may also include an embodiment in which the first feature is not right "on," "above," or "on top of" the second feature, or just means that the first feature has a sea level elevation larger than the sea level elevation of the second feature. While first feature "beneath," "below," or "on bottom of" a second feature may include an embodiment in which the first feature is right "beneath," "below," or "on bottom of" the second feature, and may also include an embodiment in which the first feature is not right "beneath," "below," or "on bottom of" the second feature, or just means that the first feature has a sea level elevation smaller than the sea level elevation of the second feature.

A dust collector 100 for a cleaner according to embodiments of the present disclosure will be described below with reference to the drawings.

As shown in FIGS. 1-5, the dust collector 100 for the cleaner according to embodiments of the present disclosure includes: a cyclone separator 1, a dust container 2 and a dust container top cover 3.

Specifically, an air inlet 201 is formed in a bottom wall of the dust container 2; the cyclone separator 1 is disposed in the dust container 2 and has a cyclone separator inlet 101 and a cyclone separator outlet 102, the cyclone separator inlet 101 is communicated with the air inlet 201; the dust container top cover 3 covers the dust container 2 and defines an air outlet 301 communicated with the cyclone separator outlet 102. The dust containing air is sucked into the dust collector 100 via the air inlet 201, and then filtered by the dust collector 100. During the filtering process, the dust piles up in the dust container 2, and the filtered air is discharged out of the cyclone separator 1 into the dust container top cover 3 via the cyclone separator outlet 102, and then discharged out of the dust collector 100 via the air outlet 301.

With the dust collector for the cleaner according to embodiments of the present disclosure, air enters the dust collector from a bottom thereof, which significantly shortens the distance from the cyclone separator inlet 101 to the air inlet 201, and shortens the length of the air guide tube communicated with the air inlet 201 in the cleaner, reduces the power loss, saves enough space for the whole cleaner and the manufacturing cost. Furthermore, because the air inlet 201 is located in the bottom wall of the dust container 2, the dust collection capacity of the dust container 2 is largely increased. In addition, the suction of the whole cleaner with the dust collector 100 is no more decreased quickly due to a block of a filter cotton, which improves the separation efficiency and prolongs the cleaning period of the filter cotton.

As shown in FIGS. 1-5, in some embodiments of the present disclosure, the dust collector 100 further includes an air intake tube 17, and two ends of the air intake tube 17 are communicated with the air inlet 201 and the cyclone separator inlet 101 respectively. Specifically, with reference to FIG. 1, a lower end of the air intake tube 17 is communicated with the air inlet 201, and an upper end of the air intake tube 17 is communicated with the cyclone separator inlet 101. Thus, it is convenient to connect the cyclone separator 1 with the dust container 2 so as to improve the mounting efficiency of the cyclone separator 1. The air inlet 201 is communicated with the cyclone separator inlet 101 via the air intake tube 17, which facilitates the flowing of the dust containing air and the connection between the cyclone separator 1 and the dust container 2 so as to improve the mounting efficiency of the cyclone separator 1.

The air intake tube 17 has no need to use a special plastic material so as to reduce the moulding cost of the air intake tube 17.

In addition, because the air inlet 201 is formed in the bottom wall of the dust container 2, it is possible to avoid the problem of a poor air tightness of the connection between the air intake tube 17 and the dust container 2, which is caused by the fact that the air intake tube 17 is connected to the bottom wall of the dust container 2 in the related art. When the air intake tube 17 is connected to the bottom wall of the dust container 2, the air tightness of the air intake tube 17 and the bottom wall of the dust container 2 may be improved so as to improve the suction when a cleaner having the dust collector 100 is working and the suction efficiency of the cleaner. Since the air intake tube 17 is connected to the bottom wall of the dust container 2, it is possible to avoid the problem of complicated shape and structure of an end of the air intake tube 17 connected to an arc-shaped side wall of the dust container 2 and the difficult processing. Moreover, the air intake tube 17 has no need to use a special plastic material so as to reduce the moulding cost of the air intake tube 17.

Figure 1:
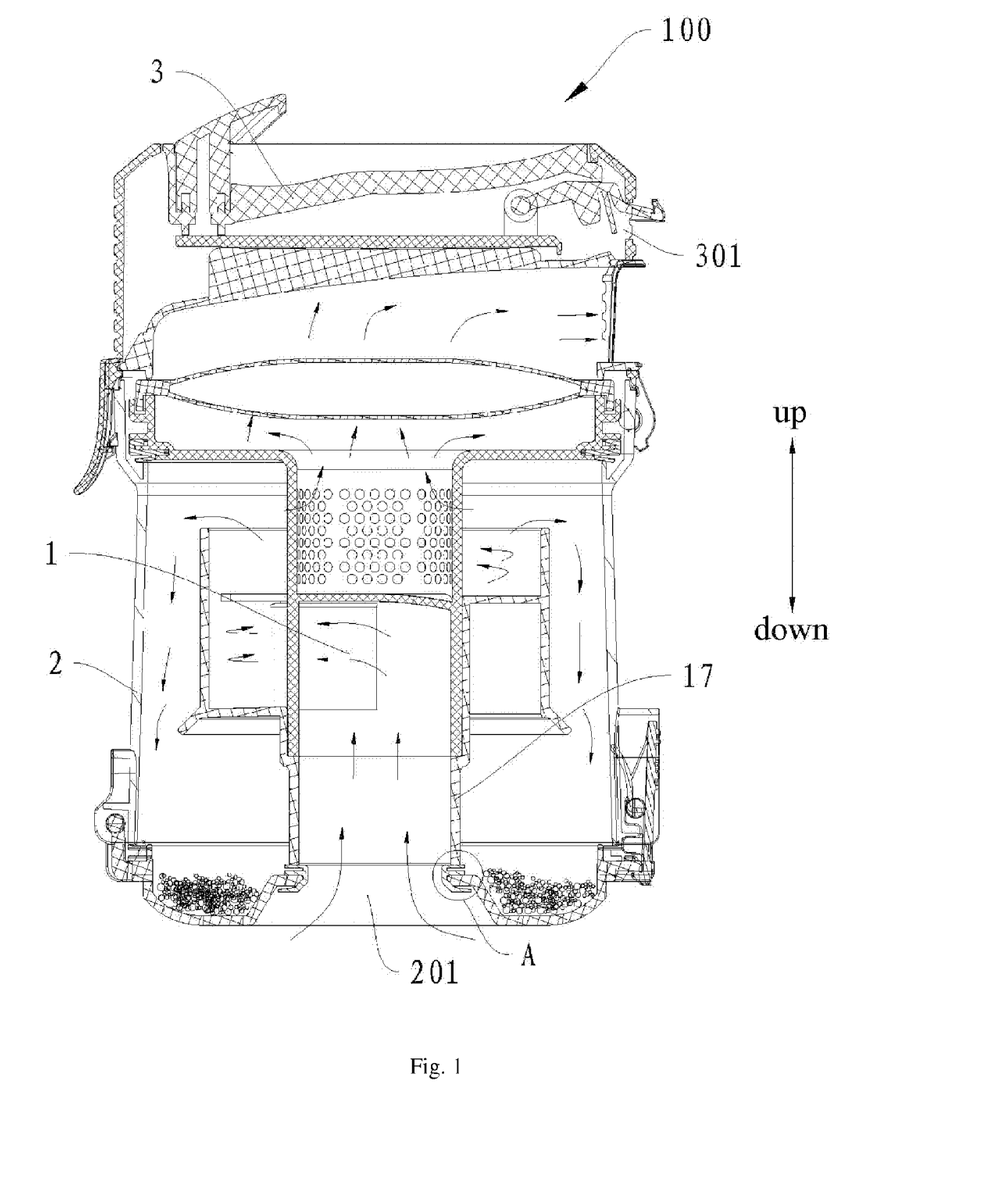
FIG. 1 is a schematic view of a dust collector for a cleaner according to an embodiment of the present disclosure.
Figure 2:
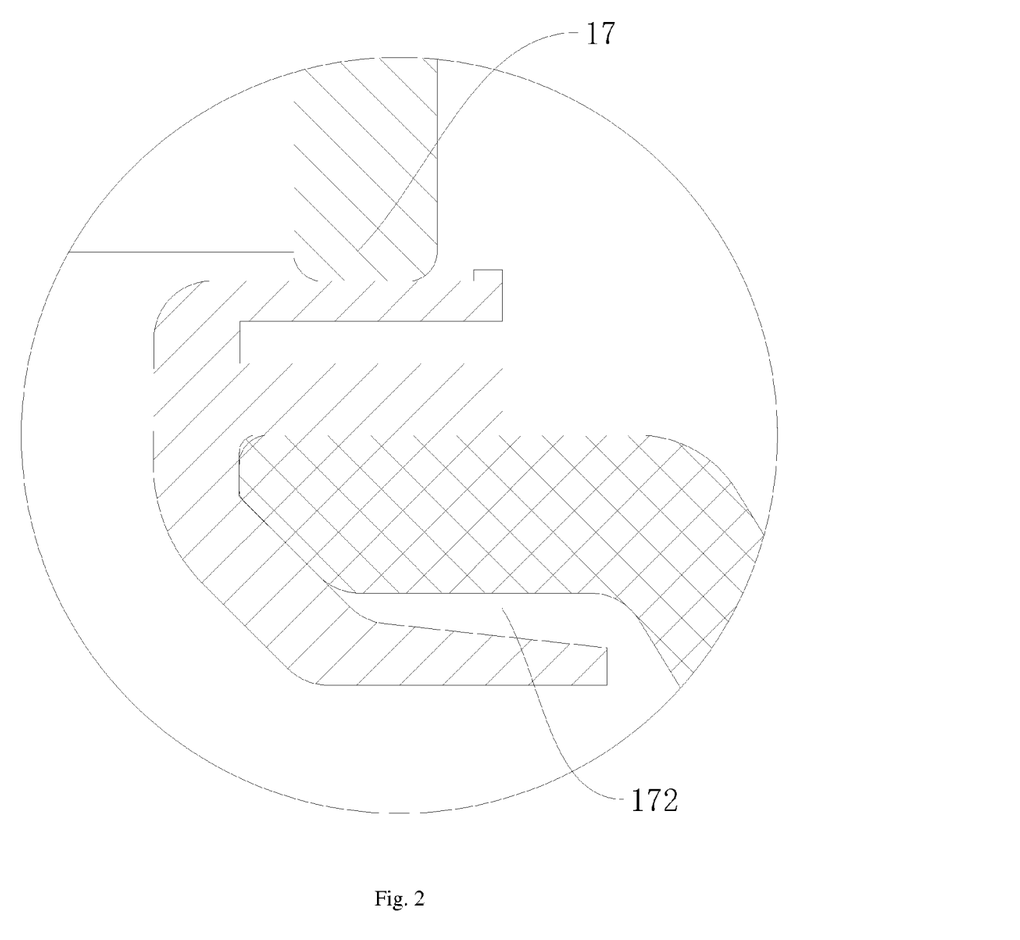
FIG. 2 is a partially enlarged view of part A in FIG. 1.

Furthermore, the lower end of the air intake tube 17 is engaged with the bottom wall of the dust container 2. Specifically, as shown in FIG. 2, an annular snapping groove 172 is formed in an outer wall of the lower end of the air intake tube 17, and an edge of the air inlet 201 of the dust container 2 is engaged within the annular snapping groove 172. Thus, the lower end of the air intake tube 17 is engaged stably with the bottom wall of the dust container 2, and it is possible to improve the air tightness of the connection between the air intake tube 17 and the bottom wall of the dust container 2.

The cyclone separator 1 according to embodiments of the present disclosure may be a cyclone separator with a cyclone separator inlet formed in a side wall of a cyclone barrel in the related art, in which the cyclone separator inlet is communicated with the air inlet via a connection tube. Certainly, the present disclosure also provides a new kind of cyclone separator 1. The structure of the cyclone separator 1 according to embodiments of the present disclosure will be described in detail below.

Figure 3:
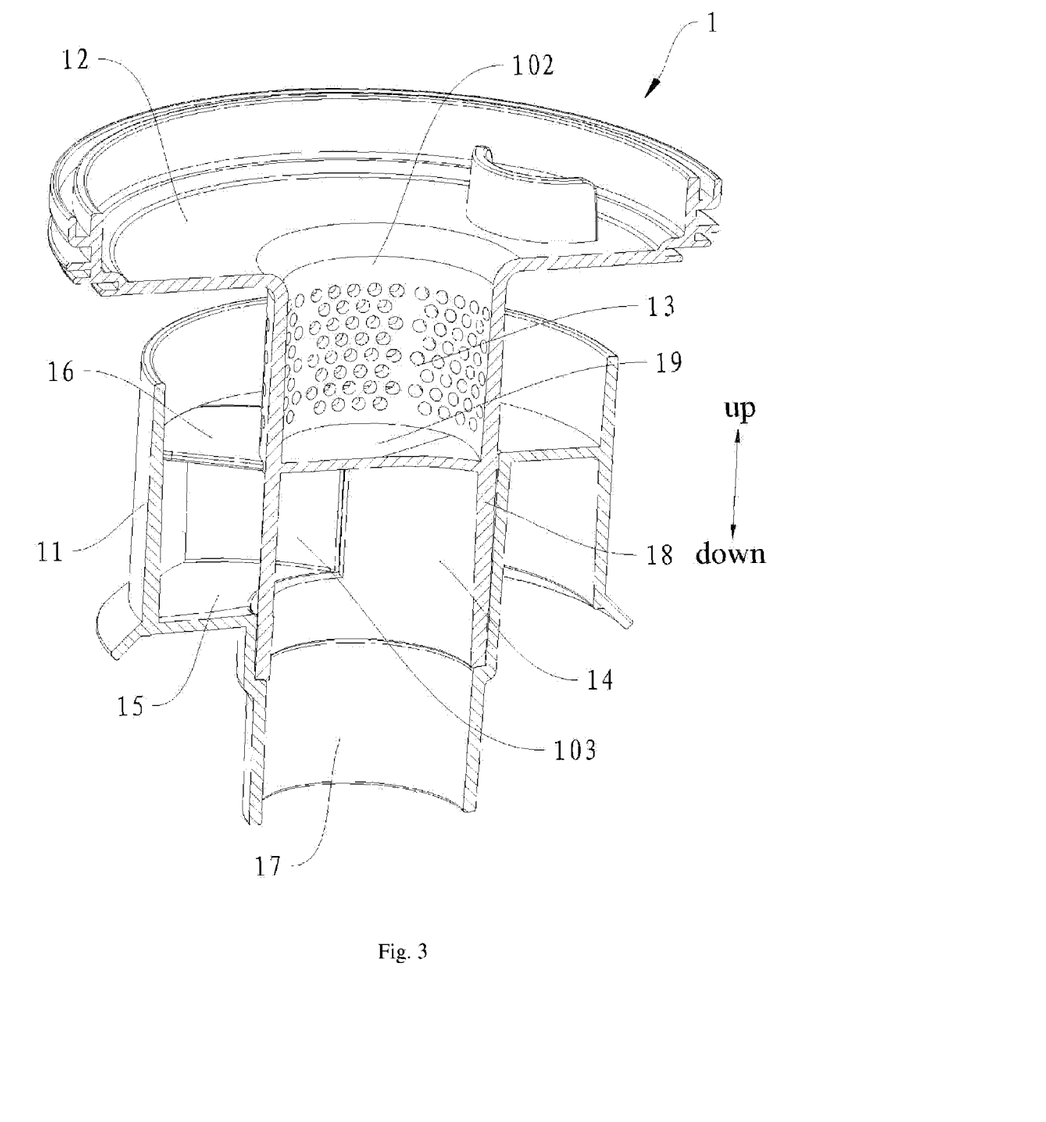
FIG. 3 is a schematic view of a cyclone separator of a dust collector for a cleaner according to an embodiment of the present disclosure.
Figure 4:
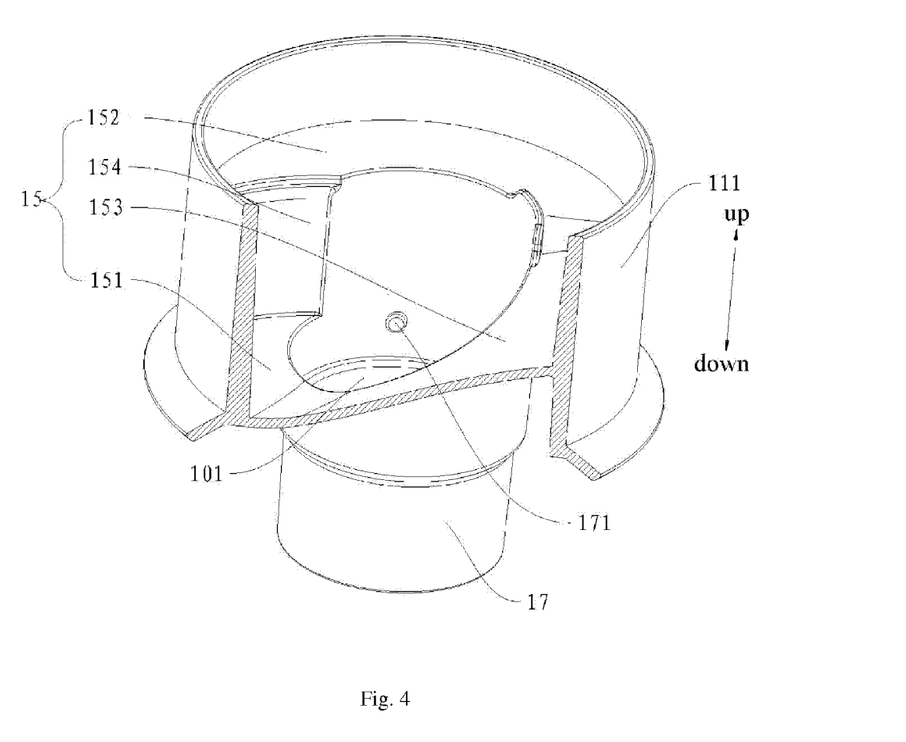
FIG. 4 is a sectional view of a cyclone barrel of a cyclone separator of a dust collector for a cleaner according to an embodiment of the present disclosure.
Figure 5:
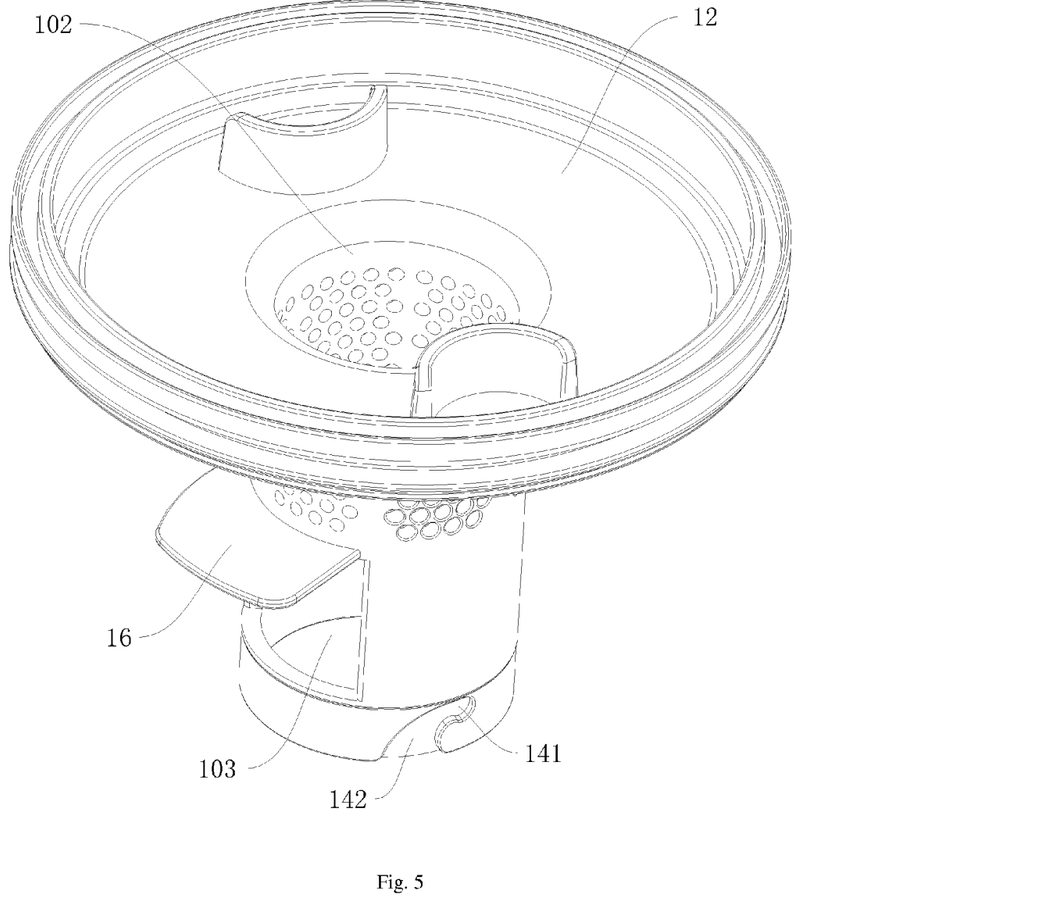
FIG. 5 is a schematic view showing the assembly of a cyclone separator end cover, a filter and an air guide barrel in a cyclone separator of a dust collector for a cleaner according to an embodiment of the present disclosure.

As shown in FIG. 3 to FIG. 5, in some embodiments of the present disclosure, the cyclone separator 1 includes: a cyclone barrel 11, a cyclone separator end cover 12, a filter 13 and an air guide barrel 14.

Specifically, an upper end of the cyclone barrel 11 is open and the cyclone separator inlet 101 is formed in a bottom wall of the cyclone barrel 11. The cyclone separator inlet 101 is used for introducing the dust containing air into the cyclone barrel 11, so that the dust containing air is separated into air and dust in the cyclone separator 1. The cyclone separator end cover 12 is disposed above the cyclone barrel 11, and the cyclone separator outlet 102 is formed in the cyclone separator end cover 12. The dust containing air is sucked into the cyclone separator 1 via the cyclone separator inlet 101, and then filtered by the cyclone separator 1. During the filtering process, the dust is separated and thrown out of the cyclone barrel 11, and the filtered air is discharged from the cyclone separator outlet 102. The filter 13 is used for filtering the dust containing air, so that the air is discharged out of the cyclone separator 1 via the filter 13. An upper end of the filter 13 is communicated with the cyclone separator outlet 102, and the upper end of the filter 13 seals a circumferential edge of the cyclone separator outlet 102, so that the dust containing air cannot pass through the cyclone separator outlet 102 and only the air filtered by the filter 13 is discharged out of the cyclone separator 1 via the cyclone separator outlet 102. A lower end of the filter 13 extends into the cyclone barrel 11. A lower end of the air guide barrel 14 is communicated with the cyclone separator inlet 103, and an upper end of the air guide barrel 14 is closed, an air vent 103 communicated with the cyclone barrel 11 is formed in a side wall of the air guide barrel 14, such that the air flow enters into the cyclone barrel 11 in a radial direction of the cyclone barrel 11 so as to facilitate the filtration of the cyclone separator 1 and the discharging of the dust from the filter 13. Thus, air enters into the dust collector from a bottom thereof and the dust containing air into the cyclone separator 1 enters into the cyclone barrel 11 in a direction away from the filter 13. The dust containing air into the cyclone barrel 11 quickly forms a spiral air flow, and the dust is thrown away from the filter 13 under a centrifugal force, which makes the dust away from the filter 13 to avoid the blockage of the filter 13 caused by the fact that the dust adheres to the filter 13. The cyclone separator may reduce the blockage of the filter 13 so as to prolong the life of the filter 13 and reduce the cleaning frequency of the filter 13.

In addition, the air inlet 201 may be conveniently communicated with the cyclone separator inlet 101.

An upper end of the dust container 2 is open, and the cyclone separator end cover 12 covers the upper end of the dust container 2. Thus, it is convenient to seal the dust container 2, which prevents the dust from rising up from the dust container 2, improves the air tightness of the dust container 2, and makes the dust collector 2 simple in structure and easy to assemble.

As shown in FIG. 3-FIG. 5, in some embodiments of the present disclosure, an air guide plate 15 and an air shield plate 16 are disposed in the cyclone barrel 11, at least a part of the air guide plate 15 extends upwardly and spirally, and the air shield plate 16 is disposed above the air vent 103 and no higher than an upper edge of the air guide plate 15. That is, the air flow entering into the cyclone barrel 11 may rise up spirally in an extended direction of the air guide plate 15 under the action of the air guide plate 15 and the air shield plate 16. Thus, the air guide structure with the air flow rising up spirally is used to move the position of the thrown dust upwardly to a largest extent. A high-efficiency cyclone separator 1 is used to raise the dust containing air flow faster on the air guide plate 15 and then throw the dust containing air flow out of the cyclone barrel 11, such that the dust-air separation is fast and thorough and strips like hairs are also easy to throw so as to reduce the amount of the dust and hairs discharged out of the cyclone separator 1 through the filter 13. The suction of the whole cleaner with the cyclone separator 1 is no more decreased quickly due to a blockage of the filter cotton, which significantly improves the separation efficiency and prolongs the cleaning period of the filter cotton.

It should be understood by those skilled in the related art that the air guide plate 15 and the air shield plate 16 is used for rising the dust containing air spirally. Certainly, the spiral rising of the dust containing air is not limited herein, the air guide structure in other forms in the related art may also be used, e.g., a spiral air channel is formed in the air guide barrel.

Furthermore, as shown in FIG. 4, the air guide plate 15 is annular and includes a first plate body 151, a second plate body 152, a spiral plate 153 and a connection plate 154. The first plate body 151 and the second plate body 152 are perpendicular to an axis of the cyclone barrel 11 respectively and the connection plate 154 is parallel to the axis of the cyclone barrel 11. That is, the first plate body 151 and the second plate body 152 are parallel to each other, and any one of the first plate body 151 and the second plate body 152 is perpendicular to the axis of the cyclone barrel 11, or with reference to FIG. 4, the first plate body 151 and the second plate body 152 are both perpendicular to an up-down direction shown in FIG. 4, and the connection plate 154 is parallel to the up-down direction shown in FIG. 4. The spiral plate 153 extends spirally in the up-down direction, that is, the spiral plate 153 extends upwardly and spirally. One end of the first plate body 151 is connected to a lower end of the spiral plate 153 and the other end of the first plate body 151 is connected to a lower end of the connection plate 154. One end of the second plate body 152 is connected to an upper end of the spiral plate 153 and the other end of the second plate body 152 is connected to an upper end of the connection plate 154. Thus, the air guide plate 15 is simple in structure and convenient to form, and it is convenient for the connection plate 154 to guide the dust containing air upwardly and spirally so as to perform the dust-air separation.

Furthermore, the first plate body 151 is disposed at a lower edge of the air vent 103, the air shield plate 16 is disposed at an upper edge of the air vent 103, and the second plate body 152 is flush with the air shield plate 16, the connection plate 154 is disposed at a side edge of the air vent 103. In other words, since the air shield plate 16 is disposed at the upper edge of the air vent 103 and the connection plate 154 is disposed at the side edge of the air vent 103, the air shield plate 16 and the connection plate 154 are used for blocking the air flow, so that the air flow flows along the first plate body 151, the spiral plate 153 and the second plate body 152 in turn, so that the air flow rises up spirally. That is, the air shield plate 16 and the connection plate 154 block the air flow entering into the cyclone barrel 11 via the air vent 103 to prevent the air flow from rising up directly, which makes the dust containing air flow easy to rise up spirally in an extended direction of the air guide plate 15 to form an air flow rising up in a sprial manner, so that it is convenient to throw the dust away under a centrifugal force. Thus, the dust containing air flow may rise up easily and spirally to avoid poor filtering effect and thus the blockage of the filter caused by the fact that the air flow rises up directly, thus improving the separation efficiency and effect of the cyclone separator 1 to separate the dust containing air flow. Moreover, the dust is thrown to reduce the amount of the dust through the filter 13.

Advantageously, the air guide plate 15 is configured as the bottom wall of the cyclone barrel 11, and the cyclone separator inlet 101 is formed in the air guide plate 15. In other words, the cyclone barrel 11 includes a cylindrical side plate 111 and an air guide plate 15. The air guide plate 15 is disposed in the cylindrical side plate 111, and the air guide plate 15 is annular. The cyclone separator inlet 101 is formed in a middle portion of the annular air guide plate 15. Thus, the air guide plate 15 is used directly as the bottom wall of the cyclone barrel 11, such that the cyclone barrel 11 is simple in structure and easy to form and the formation efficiency of the cyclone barrel 11 is improved.

It should be understood by those skilled in the related art that, the air guide plate 15 may not be configured as the bottom wall of the cyclone barrel 11, e.g., the cyclone barrel 11 is a barrel with a closed bottom and the air guide plate 15 is disposed in the cyclone barrel 11.

In addition, a spiral plate body extended spirally and a connection plate which connects the head and tail ends of the spiral plate body may also be used to form an air guide structure correspondingly.

As shown in FIG. 3 to FIG. 5, the air intake tube 17 is disposed on the bottom wall of the cyclone barrel 14, the lower end of the cyclone barrel 14 is fitted over an inner wall surface of the air intake tube 17 and a snapping projection 171 is disposed on the inner wall surface of the air intake tube 17, and a snapping groove 141 corresponding to the snapping projection 171 is formed in an outer wall of the lower end of the cyclone barrel 14. The cyclone barrel 14 is fitted in the air intake tube 17 by engaging the snapping projection 171 with the snapping groove 141. Thus, the cyclone barrel 14 is fitted in the inner wall surface of the air intake tube 17, which may improve the air tightness of the connection between the cyclone barrel 14 and the air intake tube 17. Moreover, the cyclone barrel 14 is connected to the air intake tube 17 by the engagement of the snapping projection 171 and the snapping groove 141, such that it is convenient to mount the cyclone barrel 14 and it is possible to improve the mounting efficiency of the cyclone separator 1.

In addition, it should be understood by those skilled in the related art that, the cyclone barrel 14 and the air intake tube 17 may also be formed integrally, or the cyclone barrel 14 is connected to the air intake tube 17 by welding, bolting, snap-fitting, etc.

With reference to FIG. 5, a sliding groove 142 is further formed in the air guide barrel 14, in which a first end of the sliding groove 142 extends to a lower edge of the cyclone barrel 11 in a spiral direction and is open, and a second end of the sliding groove 142 is communicated with the snapping groove 141. In the mounting process of the air guide barrel 14, the snapping projection 171 is aimed at the first end of the sliding groove 142 which is open, and the air guide barrel 14 is rotated, which makes the snapping projection 171 slide into the snapping groove 141 along the sliding groove 142, so that the snapping projection 171 is engaged with the sliding groove 142.

In addition, there are a plurality of the snapping grooves 141 and a plurality of the snapping projections 171 which are in one-to-one correspondence.

As shown in FIG. 3, in some embodiments of the present disclosure, the cyclone separator 1 further includes a barrel body 18 and a separation plate 19. The separation plate 19 is disposed in the barrel body 18 and divides an inner space of the barrel body 18 in the up-down direction, an upper portion of the barrel body 18 is configured as the filter 13, and a lower portion of the barrel body 18 is configured as the air guide barrel 14. In other words, the filter 13 and the barrel body 14 are formed integrally. Thus, the air guide barrel 14 is integrally formed on the filter 13, which may simplify the structure of the cyclone separator 1 so as to facilitate the manufacture and assembly of the cyclone separator 1.

Certainly, the air guide barrel 14 and the filter 13 may also be formed respectively, and the filter 13 is positioned right above the air guide barrel 14.

As shown in FIG. 3 and FIG. 5, in an embodiment of the present disclosure, the filter 13 and the cyclone separator end cover 12 are formed integrally. Thus, the air tightness of the connection of the filter 13 and the dust container 2 is improved, so as to further improve the suction of the cleaner with the cyclone separator 1, such that it is convenient to improve the dust collection efficiency.

Figure 6:
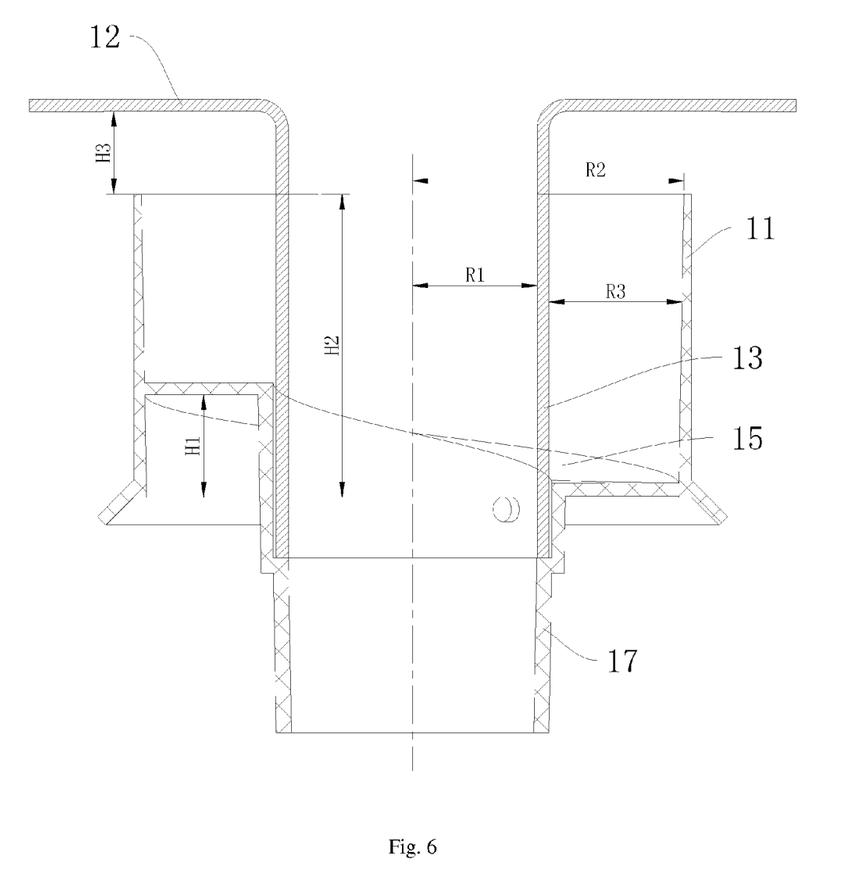
FIG. 6 is a schematic view of a cyclone separator of a dust collector for a cleaner according to an embodiment of the present disclosure.

As shown in FIG. 3 and FIG. 6, in some embodiments of the present disclosure, an upper edge of the cyclone barrel 11 is spaced apart from the cyclone separator end cover 12. Thus, impurities like dust, which are separated by the cyclone barrel 11, can be conveniently thrown away at an angle of 360 degrees. The dust-thrown position is no more limited to improve the separation effect of the cyclone separator 1 to separate the dust containing air flow.

Furthermore, the filter 13 and the cyclone barrel 11 are both cylindrical, and a central axis of the cyclone barrel 11 coincides with a central axis of the air guide barrel 14.

With reference to FIG. 6, a height H1 of the air guide plate 15 is no smaller than half of a depth H2 of the air guide barrel 14, and the height H1 of the air guide plate 15 is no greater than the depth H2 of the air guide barrel 14. In other words, $0.5H2 \leq H1 \leq H2$. Thus, the air guide effect of the cyclone barrel 11 is improved so as to facilitate the spiral rising of the air flow.

Furthermore, a distance H3 between the cyclone separator end cover 12 and the upper edge of the cyclone barrel 11 is no greater than the height H1 of the air guide plate 15. Thus, the impurities like dust are convenient to throw away, so that it not only can be avoided that the dust piles up in the cyclone barrel 11, but also it is convenient for the dust to pile up in the dust container 2.

Advantageously, a radius R1 of the filter 13 is no greater than half of a radius R2 of the cyclone barrel 11, in other words, the distance R3 between the cyclone barrel 11 and the filter 13 in a radial direction of the cyclone barrel 11 is no smaller than half of the radius R2 of the cyclone barrel 11, and no greater than the radius R2 of the cyclone barrel 11. That is, a difference valve R3 between the radius R2 of the cyclone barrel 11 and the radius R1 of the filter 13 is no smaller than half of the radius R2 of the cyclone barrel 11, and the difference valve R3 between the radius R2 of the cyclone barrel 11 and the radius R1 of the filter 13 is no greater than the radius R2 of the cyclone barrel 11, i.e., $\frac{1}{2}R2 \leq R1 \leq R2$. Thus, the impurities like dust are easy to throw away, and it is possible to avoid the blockage of the filter 13, which is caused by the fact that the impurities like dust adheres to the filter 13. Moreover, it is possible to avoid a high dust removal frequency of the filter cotton after the dust passes through the filter 13.

Accordingly, the cyclone separator may improve the separation efficiency of the dust containing air flow.

The cyclone separator 1 according to one specific embodiment of the present disclosure will be described with reference to FIG. 1 to FIG. 6 below.

The cyclone separator 1 as shown in FIG. 1 to FIG. 6 has high air tightness and high suction, and is low in cost.

Specifically, the cyclone separator 1 includes: a cyclone barrel 11, a filter 13 positioned in a center of the cyclone barrel 11 and a cyclone separator end cover 12 positioned above the filter 13. There is a gap between the cyclone separator end cover 12 and the upper edge of the cyclone barrel 11, and the air intake tube 17 is connected to the center of the bottom of the cyclone barrel 11. After the dust containing air enters into the cyclone barrel 11 through the air inlet rube 17, the dust containing air is quickly rotated by the air guide plate 15 inside of the cyclone barrel 11. The air guide plate 15 is positioned between the air intake tube 17 and the filter 13.

Because of the air inlet structure in the lower side position of the center of the cyclone separator 1, the power loss is reduced, meanwhile the position of the thrown dust is moved upwardly to a largest extent. A high efficiency cyclone separator is used to raise the dust containing air flow faster on a spiral track. The dust containing air flow is thrown away at an angle of 360 degrees and no more limited by the dust-thrown position, which makes the separation more complete. Meanwhile, strips like hairs are also easy to throw away. The suction of the whole cleaner is no more decreased quickly due to a blockage of the filter cotton, which significantly improves the separation efficiency and prolongs the cleaning period of the filter cotton.

It should be understood by those skilled in the related art that, the cyclone separator end cover 12 and the filter 13 may be formed integrally, or may be formed respectively and then assembled. The air intake tube 17, the air guide plate 15 and the cyclone barrel 11 may be formed integrally, or may be formed respectively and then assembled. The filter 13, the cyclone separator end cover 12 and the air intake tube 17 may be formed integrally, or may be formed respectively and then assembled. The air guide plate 15 and the cyclone barrel 11 may be formed integrally, or may be formed respectively and then assembled.

Because of the air inlet structure in the lower side position of the center of the dust collector 100, the length of the air intake tube 17 is shortened significantly and the power loss is reduced. The dust containing air flow is thrown away at an angle of 360 degrees and no more limited by the dust-thrown position, which makes the separation more complete. Meanwhile, strips like hairs are also easy to throw away. The suction of the whole cleaner is no more decreased quickly due to a blockage of the filter cotton, which significantly improves the separation efficiency and prolongs the cleaning period of the filter cotton.

Other structure and operation of the dust collector for a cleaner according to embodiments of the present disclosure are known to those skilled in the art and no more described in detail here.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A dust collector for a cleaner, comprising:
    a dust container defining an air inlet in a bottom wall thereof;
    a cyclone separator disposed in the dust container and defining a cyclone separator inlet communicated with the air inlet and a cyclone separator outlet;
    a dust container top cover covering the dust container and defining an air outlet communicated with the cyclone separator outlet;
    an air intake tube defining two ends communicated with the air inlet and the cyclone separator inlet respectively and being engaged with the dust container;
    wherein the cyclone separator comprises:
    a cyclone barrel defining an upper open end, the cyclone separator inlet being formed in a bottom wall of the cyclone barrel, an air guide plate and an air shield plate being disposed in the cyclone barrel, and at least a part of the air guide plate being extended upwardly and spirally;
    a cyclone separator end cover disposed above the cyclone barrel, the cyclone separator outlet being formed in the cyclone separator end cover, in which an upper end of the dust container is open, and the cyclone separator end cover covers the upper end of the dust container;
    a filter defining an upper end communicated with the cyclone separator outlet, and a lower end extended into the cyclone barrel;
    an air guide barrel defining a lower end communicated with the cyclone separator inlet and an upper closed end, and defining an air vent in a side wall of the air guide barrel communicated with the cyclone barrel,
    the air shield plate being disposed above the air vent and no higher than an upper edge of the air guide plate;
    wherein the air guide plate is annular and comprises:
    first and second plate bodies perpendicular to an axis of the cyclone barrel respectively;
    a spiral plate extended spirally in an up-down direction, and defining two ends connected to the first and second plate bodies respectively;
    a connection plate parallel to an axis of the cyclone separator, and defining two ends connected to the first and second plate bodies respectively.

2. The dust collector for the cleaner according to claim 1, wherein the cyclone separator further comprises a barrel body and a separation plate disposed in the barrel body and dividing an inner space of the barrel body in the up-down direction, an upper portion of the barrel body is configured as the filter, and a lower portion of the barrel body is configured as the air guide barrel.

3. The dust collector for the cleaner according to claim 1, wherein the air guide plate is configured as the bottom wall of the cyclone barrel, and the cyclone separator inlet is formed in the air guide plate.

4. The dust collector for the cleaner according to claim 3, wherein the cyclone separator further comprises a barrel body and a separation plate disposed in the barrel body and dividing an inner space of the barrel body in the up-down direction, an upper portion of the barrel body is configured as the filter, and a lower portion of the barrel body is configured as the air guide barrel.

5. The dust collector for the cleaner according to claim 1, wherein the first plate body is disposed at a lower edge of the air vent, the air shield plate is disposed at an upper edge of the air vent, the second plate body is flush with the air shield plate, and the connection plate is disposed at a side edge of the air vent.

6. The dust collector for the cleaner according to claim 5, wherein the air guide plate is configured as the bottom wall of the cyclone barrel, and the cyclone separator inlet is formed in the air guide plate.

7. The dust collector for the cleaner according to claim 5, wherein the cyclone separator further comprises a barrel body and a separation plate disposed in the barrel body and dividing an inner space of the barrel body in the up-down direction, an upper portion of the barrel body is configured as the filter, and a lower portion of the barrel body is configured as the air guide barrel.

* * * * *